Figure 1:
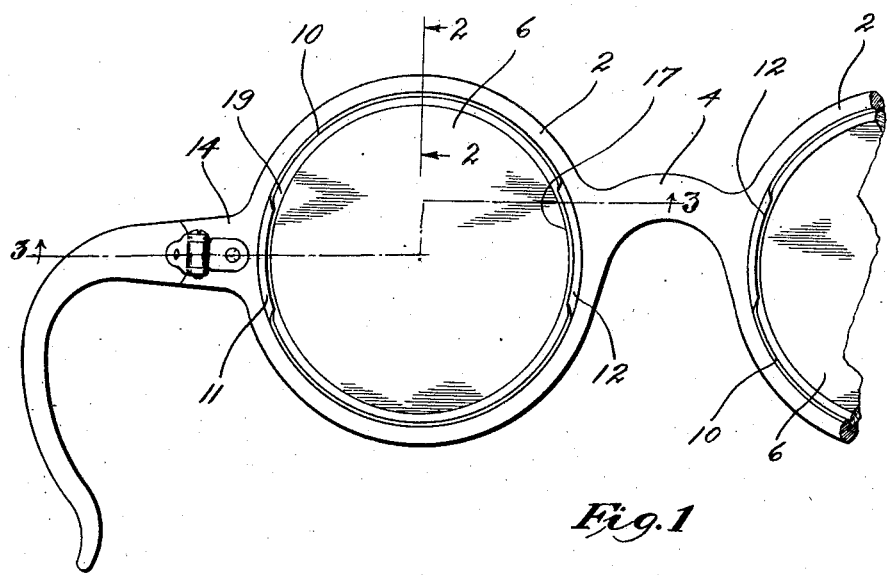

Sept. 21, 1926.  F. A. STEVENS  1,600,606

OPHTHALMIC MOUNTING

Filed Sept. 2, 1924

Inventor
Frederick A. Stevens
David Rines
Attorney

Patented Sept. 21, 1926.

1,600,606

UNITED STATES PATENT OFFICE.

FREDERICK ARTHUR STEVENS, OF PROVIDENCE, RHODE ISLAND, ASSIGNOR TO BAUSCH AND LOMB OPTICAL COMPANY, OF ROCHESTER, NEW YORK, A CORPORATION OF NEW YORK.

OPHTHALMIC MOUNTING.

Application filed September 2, 1924. Serial No. 735,237.

The present invention relates to ophthalmic mountings comprising endless lens-holding rims, and more particularly to mountings of the all-"shell" type, constituted of non-metal material, like celluloid, zylonite and the like.

As the non-metal material, though more or less resilient, is not sufficiently so to permit mounting lenses within the endless rims at ordinary temperatures, it is necessary to apply heat, which permits of stretching or expanding the rims to increase temporarily their calibre. This is a drawback, for besides the inconvenience attending the heat application, the mounting may become distorted in consequence; in fact, it frequently cracks as a result.

Endless non-metal rims have been heretofore proposed, so constructed as to permit lenses to be inserted within them by temporarily springing back resilient segmental members that are allowed to return by their resiliency into their normal places after the lens has been forced into its seat. The temporary springing back of the segmental members serves to increase for the moment the calibre of the groove, permitting entry of the lens. Owing to the resilient nature of the segmental members, however, they can not hold the lens tightly in place, so that additional metal clamping members have been needed to clamp the non-metal rim against the lens, and thereby prevent accidental rotation of the lens within its seat.

In a copending application, Serial No. 479,480, filed June 22, 1921, of which the present application is a continuation in part, and which has matured into Patent No. 1,520,977, December 30, 1924, there is disclosed and claimed an ophthalmic mounting within the endless rims of which lenses may be tightly, non-rotatably mounted without the necessity of previously expanding or stretching the non-metal material. The lens-receiving grooves are each provided, on one side, with a wall against which the lens is adapted to rest, the other side of the groove being cut away, or open. This makes it possible to insert within the groove, by way of the open side, a lens of diameter substantially equal to the calibre of the groove. Small clips, that are preferably integral with the body of the mounting, are provided at the open side of the groove to prevent the lens falling out of the groove. In the preferred construction, one clip is provided near the temple end piece, and another near the bridge, though the number, the location and the dimension of the clips may be varied as desired. When integral clips are employed, it is necessary to move one or more of them temporarily aside to permit inserting the lens. This may be effected by temporarily bending or springing back the portion of the rim near the temple end piece, or the bridge end piece, a little out of its plane. The bending or springing is rendered possible by the resilient character of the material of which the mounting is constituted.

According to the present invention, the said other side of the lens-receiving groove, though cut away, or open, is not completely so.

Figure 2:
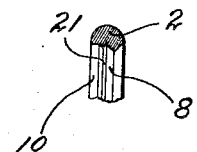
Figure 3:
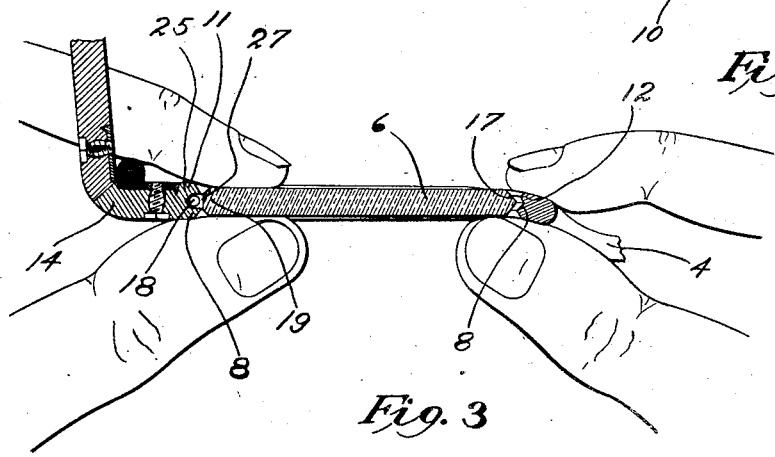

The invention will be described in connection with the accompanying drawings, in which Fig. 1 is a rear elevation of a portion of a spectacle mounting constructed according to a preferred embodiment of the present invention; Fig. 2 is a section taken upon the line 2—2 of Fig. 1, looking in the direction of the arrows; and Fig. 3 is a section taken upon the line 3—3 of Fig. 1, illustrating the act of inserting a lens in its lens groove.

Ophthalmic mountings of the above-described character, constituted of non-metal material, like celluloid, zylonite and the like, comprise two endless rims 2 integrally connected together by a bridge 4, and each having integral temple end pieces 14. The bridge and the end pieces need not, however, be integral. They may be made of metal or other material and they may be attached to the rims in any well-known manner.

The lens-receiving grooves described and claimed in the aforesaid application are each provided on one side with a wall 8, against which the lens 6 is adapted to rest, the other side of the groove being cut away, or open, as shown at 10. This makes it possible to insert within the groove, by way of the open side 10, a lens of diameter substantially equal to the calibre of the groove. One or more clips are provided at the open side of the groove to prevent the lens falling out of the groove. A clip 11 is shown provided near the temple end piece, and a clip 12 near the bridge, but it will be understood that the number, the location and the dimension of the clips may be varied as desired.

The clips are shown integral with the body of the mounting, but they may be separable and they may be constituted of metal or any other desired material. Separable clips may be preferred if the rims are made of metal, and the use of such is considered to be within the scope of the present invention. When separable clips are employed, they may be removed, and replaced after the lens has become seated in its groove. If integral clips such as are shown are employed, it is necessary to move one or more of them, as the clip 12, temporarily aside to permit inserting the lens. This may be effected by temporarily bending or springing back the portion of the rim 2 near the bridge 4, for example, a little out of its plane, as is illustrated in Fig. 3. The bending or springing is rendered possible by the resilient character of the material of which the mounting is constituted. To supply the necessary leverage for the bending or springing action, the temple end piece and the bridge may be grasped, one in each hand, as is illustrated in Fig. 3.

One side 19 of the lens is then placed in position between the other clip 11 and the portion of the wall 8 of the lens groove near the temple end piece 14, and the portion of the rim near the bridge 4 may be allowed to spring or snap back into its plane, into position over the opposite side 17 of the lens, with the clip 12 over the edge 17 of the lens. The lens is thus readily and conveniently mounted within its groove, and is retained within its groove by the wall 8 engaging one of its faces, and the clips engaging the other face.

As it is unnecessary to distort the rims by heat or otherwise, the mounting will permanently retain its original shape, so that when a properly shaped lens is once properly fitted into a groove of proper size and shape, it will remain properly fitted, neither too loose nor too tight. The dangers of accidental axial derangement of the lens within its groove, caused by the lens being too loose, and of the rim cracking, caused by the lens being too tight in its groove, are thus eliminated.

According to the present invention, the side 10 of the lens-receiving groove is not completely cut away but is provided with a wall 21 of dimension such that the calibre of the groove at the side 10 is still larger than the smallest calibre of the wall 8, but not too small to permit entry of the lens. The lens is adapted to enter the groove by way of the wall 21 in the same manner as heretofore described. The walls 8 and 21 are preferably provided with a beveled groove between them, as shown more particularly in Fig. 2, which constitutes the lens-receiving groove and within which a beveled periphery of the lens is adapted to seat. These two walls 8 and 21 therefore act very much as do the prior-art walls of lens-receiving grooves, holding the lens in position between them, even without the aid of the clips 11 and 12. The construction is, however, an improvement on the prior art in that provision is thus made for snapping a lens into position without the aid of heat.

No lens-rotation-preventing means is necessary if the lens is properly fitted to the calibre of the rim, but a removable locking member 18 may be provided in registering notches of the lens groove and the lens to prevent rotation of improperly fitted lenses, as described in a copending application, Serial No. 572,155, filed July 1, 1922 which has matured into Patent No. 1,545,529, July 14, 1925.

It will be understood that the invention is not restricted to the exact embodiment thereof that is illustrated in the accompanying drawings and described herein, and that all modifications within the skill of the artisan are considered to be within the spirit and scope of the present invention, as defined in the appended claims.

What is claimed is:

1. An ophthalmic mounting comprising an endless zylonite rim having a lens-receiving groove of calibre substantially equal to the dimension of the lens, one side of the groove being cut away to permit entry of the lens, the said side of the groove being provided with a wall to retain the lens within the groove.

2. An ophthalmic mounting comprising an endless zylonite rim having a lens-receiving groove provided on one side with a wall against which the lens is adapted to rest, the other side of the groove having a wall of larger calibre than the calibre of the first-named wall, but of less calibre than the calibre of the groove, whereby a lens of dimension substantially equal to the calibre of the groove may be mounted in the groove by way of the wall of larger calibre, the lens being adapted to be retained within the groove between the two walls.

3. An ophthalmic mounting comprising an endless rim having a lens-receiving groove provided on one side with a wall against which the lens is adapted to rest, the other side of the groove having a wall of larger calibre than the calibre of the first-named wall but of less calibre than the calibre of the groove, and having one or more clips for retaining a lens within the groove, whereby a lens of dimension substantially equal to the calibre of the groove may be mounted in the groove by way of the wall of larger calibre by temporarily bending the portion of the rim near a clip out of its plane.

4. An ophthalmic mounting comprising an endless rim constituted of non-metal material having a bridge and a temple end piece and a lens-receiving groove provided on one side with a wall against which the lens is adapted to rest, the other side of the groove having a wall of larger calibre than the calibre of the first-named wall but of less calibre than the calibre of the groove to permit a lens of dimension substantially equal to the calibre of the groove to be mounted in the groove by way of the wall of larger calibre by grasping the bridge and the temple end piece, one in each hand, and temporarily bending the portion of the rim near the temple end piece out of its plane, the said other side of the groove having one or more clips for retaining the lens within the groove.

5. An ophthalmic mounting comprising an endless zylonite rim having walls on both sides of the groove provided with a lens-receiving groove, the walls of the groove being of different calibre to permit a lens of dimension substantially equal to the calibre of the groove to be snapped into position within the groove by way of the side of larger calibre, the wall of larger calibre being of less calibre than the calibre of the groove.

In testimony thereof, I have hereunto subscribed my name this 27th day of August, 1924.

FREDERICK A. STEVENS.